(12) United States Patent
Sharrow et al.

(10) Patent No.: US 11,976,563 B2
(45) Date of Patent: May 7, 2024

(54) JOURNAL BEARING WITH UNIQUE OIL FEED ARRANGEMENT

(71) Applicant: GENERAL ELECTRIC COMPANY, Schenectady, NY (US)

(72) Inventors: Edward J. Sharrow, Schenectady, NY (US); Thomas W. Swart, Schenectady, NY (US); Gerardo Mendoza Barrera, Querétaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/180,411

(22) Filed: Mar. 8, 2023

(65) Prior Publication Data

US 2023/0340891 A1    Oct. 26, 2023

Related U.S. Application Data

(60) Provisional application No. 63/363,429, filed on Apr. 22, 2022.

(51) Int. Cl.
*F01D 25/16* (2006.01)

(52) U.S. Cl.
CPC ........ *F01D 25/166* (2013.01); *F05D 2220/31* (2013.01); *F05D 2230/80* (2013.01); *F05D 2240/53* (2013.01)

(58) Field of Classification Search
CPC ... F01D 25/166; F01D 25/186; F05D 2240/53
See application file for complete search history.

(56) References Cited

U.S. PATENT DOCUMENTS

| 3,743,367 | A | 7/1973 | Raimondi |
| 4,152,032 | A | 5/1979 | Haug et al. |
| 2012/0257848 | A1 | 10/2012 | Shimano et al. |
| 2015/0322958 | A1* | 11/2015 | Date ...................... F01D 25/243 29/889.22 |
| 2020/0392986 | A1* | 12/2020 | Yoshimine ............ F16C 33/124 |

FOREIGN PATENT DOCUMENTS

EP        2 824 338 A1    1/2015

OTHER PUBLICATIONS

Search Report, EP 23167235.3, dated Sep. 18, 2023 (10 pp.).

* cited by examiner

*Primary Examiner* — Brian O Peters
(74) *Attorney, Agent, or Firm* — Eversheds Sutherland (US) LLP

(57) ABSTRACT

The present application provides a journal bearing assembly for use with a rotor shaft of a turbine engine. The journal bearing assembly may include an outer shell, an internal oil feed port on a first side of the outer shell, an external oil feed port on a second side of the outer shell, and a connecting bore in communication with the internal oil feed port and the external oil feed port.

17 Claims, 3 Drawing Sheets

US 11,976,563 B2

JOURNAL BEARING WITH UNIQUE OIL FEED ARRANGEMENT

RELATED APPLICATIONS

The present application is a non-provisional application claiming priority to U.S. Provisional Application No. 63/363,429, filed on Apr. 22, 2022. U.S. Provisional Application No. 63/363,429 is incorporated by reference herein in full.

TECHNICAL FIELD

The present application and the resultant patent relate generally to rotary machines and more particularly relate to a retrofit journal bearing assembly with a unique oil feed arrangement to provide uniform oil feed ports across a fleet of steam turbine engines having different manufacturers and different configurations.

BACKGROUND

A steam turbine engine and the like generally uses a number of journal bearings to support a rotating shaft extending through the pressure sections. Oil or other types of lubricants may flow between the inner surface of the bearing and the shaft. The oil or other lubricant may enter the journal bearing via an oil feed port, flow around the rotor shaft, and exit via an oil discharge port. Different turbine manufacturers may locate the oil ports in different locations. For example, some manufacturers may position the oil feed port on the upcoming side while others may position the oil feed port on the down-coming side. There is a desire, however, to have uniformity across a fleet of steam turbine engines and the like for improved overall operational and maintenance efficiencies. Preferably such a retrofit may be accomplished with a minimum of downtime with little need for field modifications of other types of turbine engine components.

SUMMARY

The present application and the resultant patent thus provide a journal bearing assembly for use with a rotor shaft of a turbine engine. The journal bearing assembly may include an outer shell, an internal oil feed port on a first side of the outer shell, an external oil feed port on a second side of the outer shell, and a connecting bore in communication with the internal oil feed port and the external oil feed port.

The present application and the resultant patent further provide a method of moving an external oil feed port from a first side to a second side of a journal bearing assembly. The method may include the steps of forming the external oil feed port on the second side and drilling a connecting bore from a feed bore in communication with an internal oil feed port on the first side to the external oil feed port on the second side.

The present application and the resultant patent further provide a steam turbine engine. The steam turbine engine may include a number of pressure sections, a rotor shaft extending through the pressure sections, and a number of journal bearing assemblies supporting the rotor shaft. The journal bearing assemblies may include an internal oil feed port of a first side thereof and an external oil feed port on a second side thereof.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
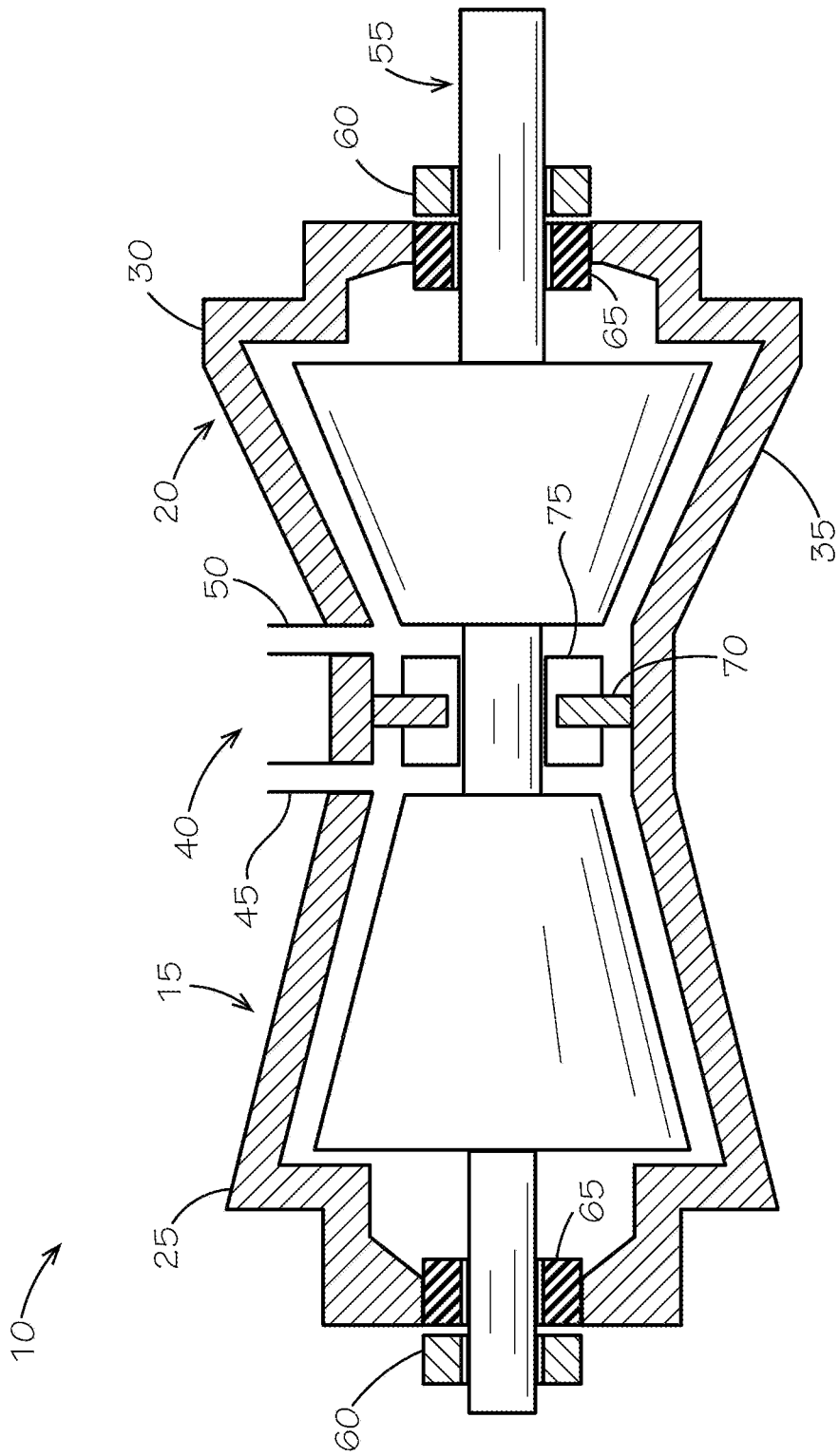
FIG. 1 is a schematic diagram of an exemplary steam turbine engine with a number of pressure sections, a rotor shaft, and a number of journal bearings.

Referring now to the drawings, in which like numerals refer to like elements throughout the several views, FIG. 1 shows a schematic diagram of an example of a steam turbine 10. Generally described, the steam turbine 10 may include a high pressure section 15 and an intermediate pressure section 20. Other pressures in other sections also may be used herein. An outer shell or casing 25 may be divided axially into an upper half section 30 and a lower half section 35. A central section 40 of the casing 25 may include a high pressure steam inlet 45 and an intermediate pressure steam inlet 50. Within the casing 25, the high pressure section 15 and the intermediate pressure section 20 may be arranged about a rotor shaft 55. The rotor shaft 55 may be supported by a number of journal bearings 60. A steam seal unit 65 may be located inboard of each of the journal bearings 60. An annular section divider 70 may extend radially inward from the central section 40 towards the rotor. The annular section divider 70 may include a number of packing casings 75. Other components and other configurations may be used.

During operation, the high pressure steam inlet 45 receives high pressure and high temperature steam from a steam source. The steam may be routed through the high pressure section 15 such that work is extracted from the steam by rotation of the rotor shaft 55. The steam exits the high pressure section 15 and then may be returned to the steam source for reheating. The reheated steam then may be rerouted to the intermediate pressure steam inlet 50. The steam may be returned to the intermediate pressure section 20 at a reduced pressure as compared to the steam entering the high pressure section 15 but at a temperature that is approximately equal to the temperature of the steam entering the high pressure section 15.

Figure 2:
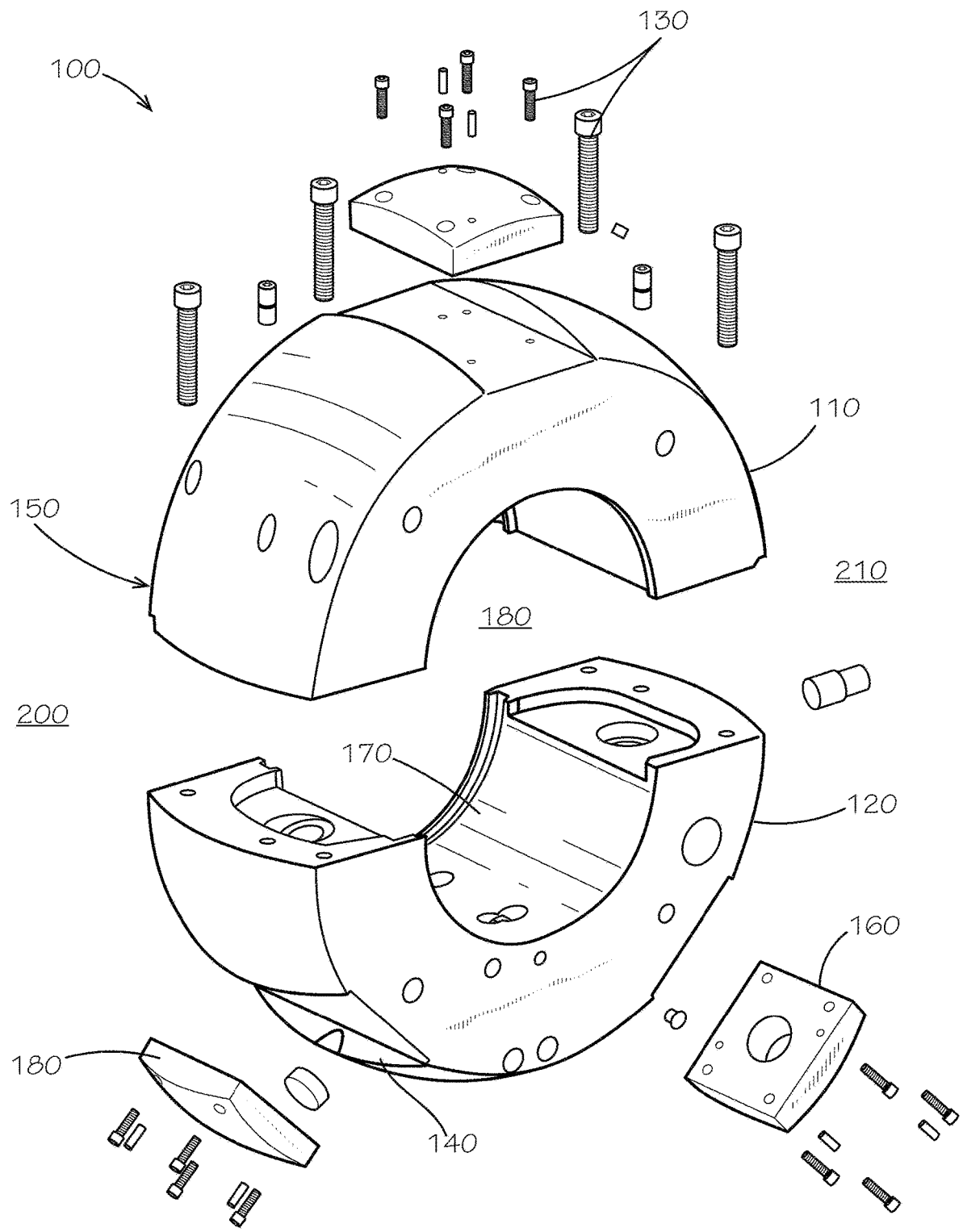
FIG. 2 is an exploded view of a journal bearing assembly as may be described herein.

FIG. 2 shows an exploded view of a journal bearing assembly 100 as may be described herein. Generally described, the journal bearing assembly 100 may include a first or an upper half 110 and a second or a lower half 120. The upper half 110 and the lower half 120 may be secured by a number of bolts 130 or other types of fasteners. The upper half 110 and the lower half 120 may have a number of support pad indentations 140 formed in an outer shell 150. A support pad 160 may be fastened therein. The support pads 160 may be part of the overall support structure. An inner bearing surface 170 defines a shaft aperture 180 therethrough. The shaft aperture 180 may be sized for the configuration of the intended rotor shaft 55. Other components and other configurations may be used herein.

Figure 3:
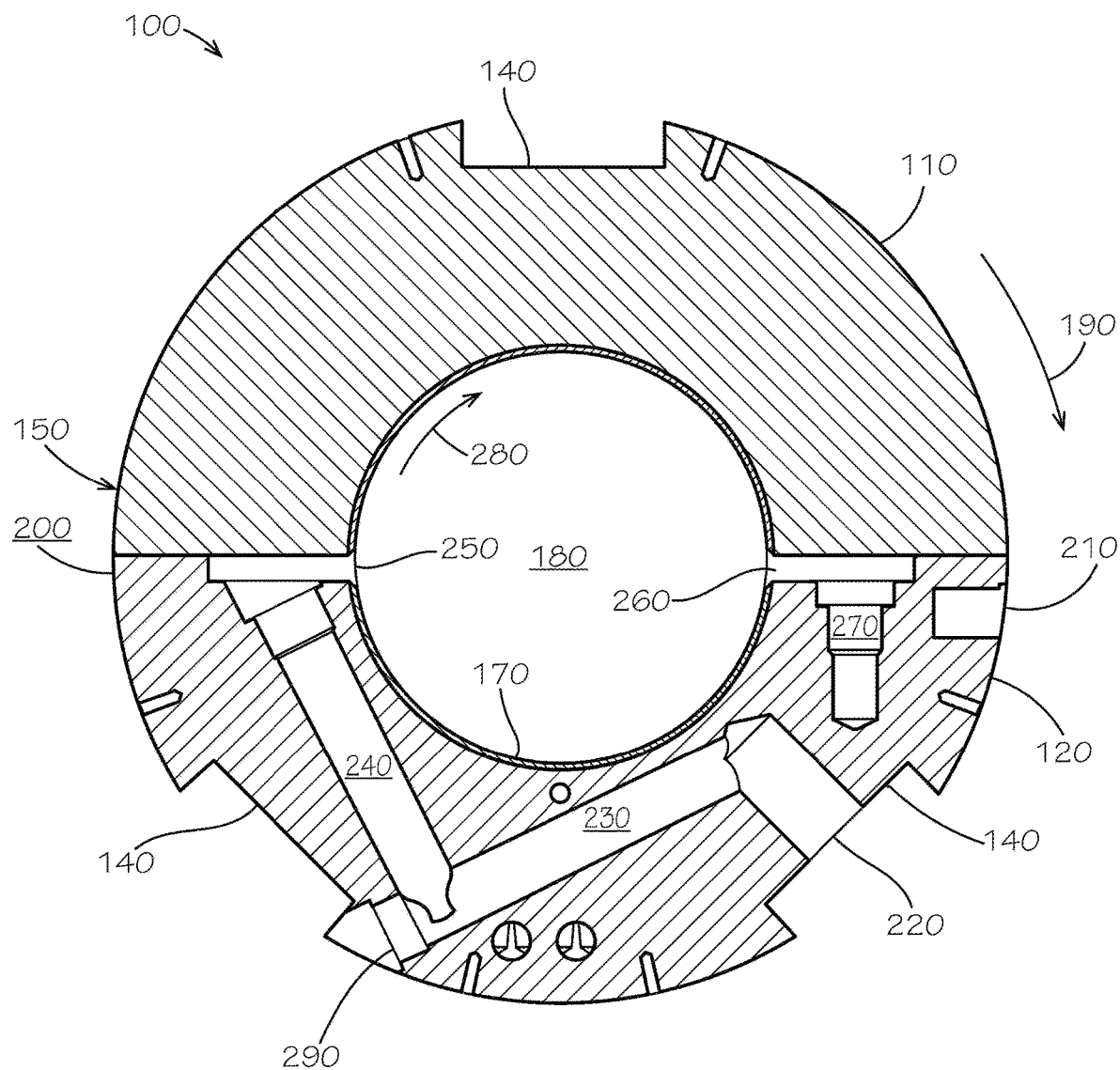
FIG. 3 is partial cross-sectional view of the journal bearing assembly of FIG. 2.

FIG. 3 shows a cross-sectional view of the journal bearing assembly 100 as viewed from the steam turbine 10 (as opposed to the generator end) with the direction of rotation of the rotor shaft 55 shown by arrow 190. The outer shell 150 may have a first side or a left side 200 and a second side or a right side 210 as viewed in this direction. The journal bearing assembly 100 may have an external oil feed port 220 positioned on the right side 210 of the lower half 120 of the outer shell 150. A connecting bore 230 may be drilled through the lower half 120 of the outer shell 150 from an existing feed bore 240 on the left side 200 to the external oil feed port 220 on the right side 210. The existing feed bore 240 is, in turn, in communication with an internal oil feed port 250. The internal oil feed port 250 may extend through the inner bearing surface 170 and is in communication with the shaft aperture 180. The external oil feed port 220 and the internal oil feed port 250 thus are on opposite sides of the overall journal bearing assembly 100.

An internal oil drain port 260 may be positioned on the right side of the shaft aperture 180 opposite the internal oil feed port 250. The internal oil drain port 260 is in communication with a drainage bore 270. The drainage bore 270 is in communication with other components so as to drain the flow of oil from the shaft aperture 180. Other components and other configurations may be used herein.

In use, a flow of oil 280 or other type of lubricant may flow into the external oil feed port 220, through the connecting bore 230, through the feed bore 240, and through the internal oil feed port 250 and into the shaft aperture 180 so as to provide smooth rotation of the rotor shaft 55 therein. The incoming flow of oil 280 thus starts in the external oil feed port 220 on the right side 210 and flows to the internal oil feed port 250 on the left side 200. The flow of oil 280 travels along the inner bearing surface 170 in the direction of rotation 190 of the rotor shaft 55 and exits via the internal oil drain port 260 and the drainage bore 270.

In order to retrofit an existing journal bearing 60 to position the external oil feed port 220 on the right side 210 of the journal bearing assembly 100, the external oil feed port 220 may be drilled or otherwise formed into the outer shell 150 (alternatively an existing port, such as a former drainage port may be used). The connecting bore 230 may be drilled therein to connect the external oil feed port 220 and the existing feed bore 240. A cap 290 may be positioned in the outer shell 150 to close off the connecting bore 230. The drainage bore 270 likewise may be drilled from the internal oil drain port 260 and axially out of the outer shell 150 (as opposed to existing passages that traditionally extended radially to an interface with the bearing support structure).

The journal bearing assembly 100 thus allows for the external oil feed port 220 and the internal oil feed port 250 to be located on opposite side of the outer shell 150. Moreover, there is no requirement for an external oil drain port extending through the bearing support structure so as to eliminate field modifications thereof. The journal bearing assembly 100 thus provides uniformity over a fleet of steam turbines 10. Although the journal bearing assembly 100 has been discussed in the context of steam turbines 10, the journal bearing assembly 100 is applicable to gas turbine engines and other types of rotary machines.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. A journal bearing assembly for use with a rotor shaft of a turbine engine, comprising:
    an outer shell;
    an internal oil feed port on a first side of the outer shell;
    an external oil feed port on a second side of the outer shell;
    a connecting bore in communication with the internal oil feed port and the external oil feed port;
    an internal oil drain port in communication with the inner bearing surface; and
    a drainage bore in communication with the internal oil drain port and extending through and outside of the second side of the outer shell.

2. The journal bearing assembly of claim 1, wherein the outer shell comprises an upper half and a lower half.

3. The journal bearing assembly of claim 1, wherein the outer shell comprises an inner bearing surface.

4. The journal bearing assembly of claim 3, wherein the inner bearing surface comprises a shaft aperture.

5. The journal bearing assembly of claim 3, wherein the internal oil feed port is in communication with the inner bearing surface.

6. The journal bearing assembly of claim 4, wherein the shaft aperture accommodates the rotor shaft therethough.

7. The journal bearing assembly of claim 1, wherein the internal oil drain port is positioned on the second side of the outer shell.

8. The journal bearing assembly of claim 1, wherein the outer shell comprises a plurality of support pads positioned thereon.

9. The journal bearing assembly of claim 8, wherein the drainage bore is separated from the plurality of support pads.

10. The journal bearing assembly of claim 1, further comprising a feed bore in communication with the internal oil feed port and the connecting bore.

11. The journal bearing assembly of claim 1, wherein the connecting bore comprises a cap thereon.

12. The journal bearing assembly of claim 1, further comprising a flow of oil therethrough.

13. A steam turbine, comprising:
    a plurality of pressure sections;
    a rotor shaft extending through the plurality of pressure sections; and
    a plurality of journal bearing assemblies supporting the rotor shaft;
    wherein the plurality of journal bearing assemblies comprises an internal oil feed port on a first side thereof and an external oil feed port on a second side thereof; and
    wherein the plurality of journal bearing assemblies comprises an internal oil drain port and a drainage bore extending through and outside of the second side thereof.

14. The steam turbine of claim 13, wherein the plurality of journal bearing assemblies comprises a connecting bore in communication with the internal oil feed port and the external oil feed port.

15. The steam turbine of claim 14, wherein the plurality of journal bearing assemblies comprises a feed bore in communication with the internal oil feed port and the connecting bore.

16. The steam turbine of claim 13, wherein the plurality of journal bearing assemblies comprises an inner bearing surface in communication with the internal oil feed port.

17. The steam turbine of claim 16, wherein the internal drain port is in communication with the inner bearing surface.

* * * * *